Oct. 2, 1945.   R. G. AURIEN   2,385,909
CLASP BRAKE
Filed Feb. 25, 1944   3 Sheets-Sheet 1
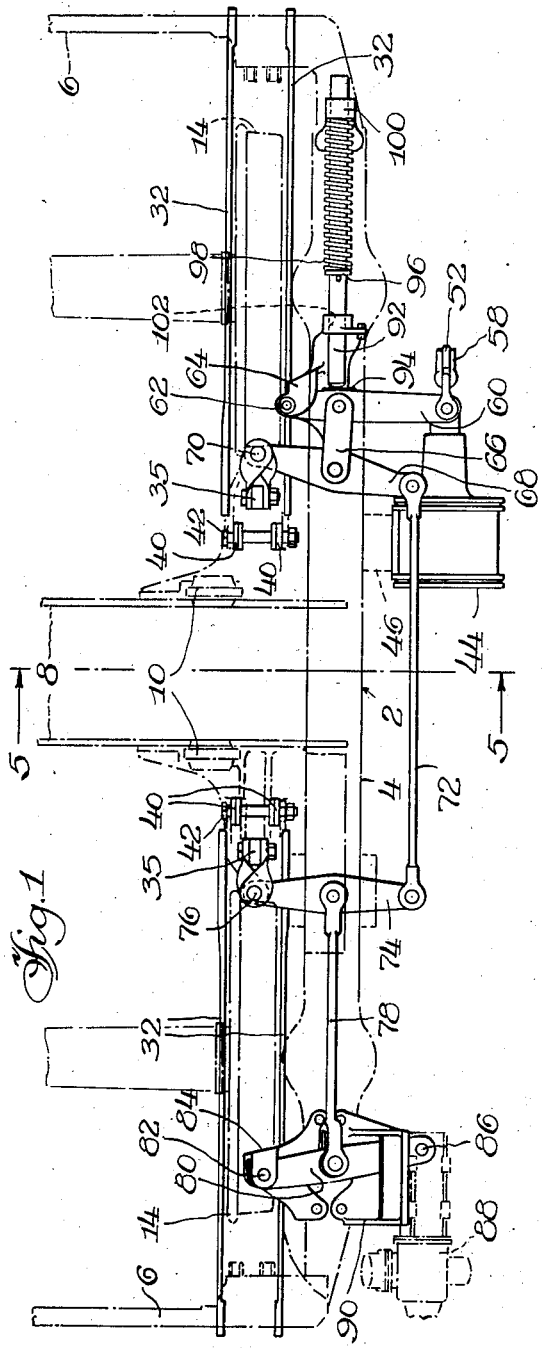
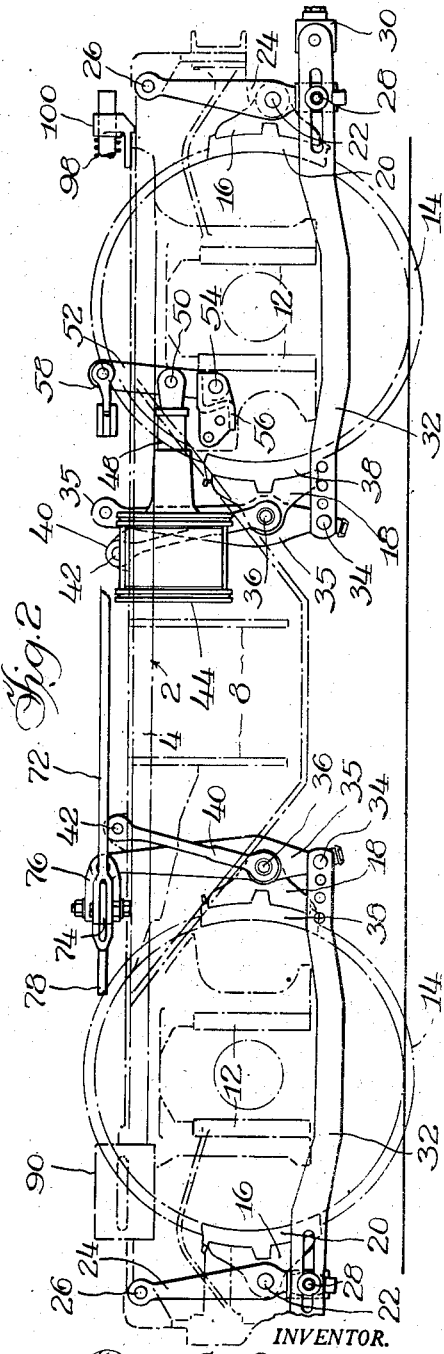
INVENTOR.
Ray G. Aurien
BY
Orrin O. B. Garner
Atty.

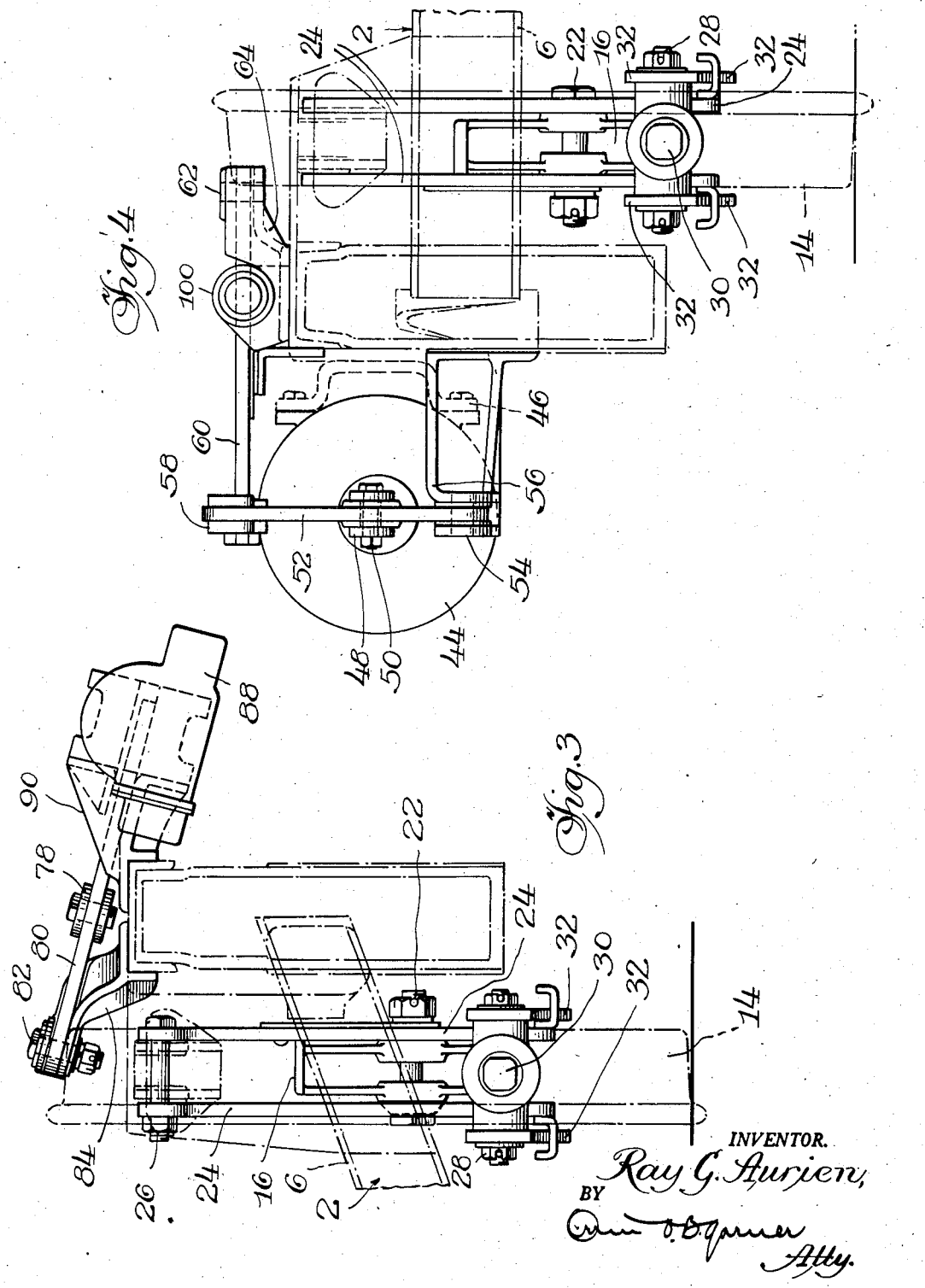

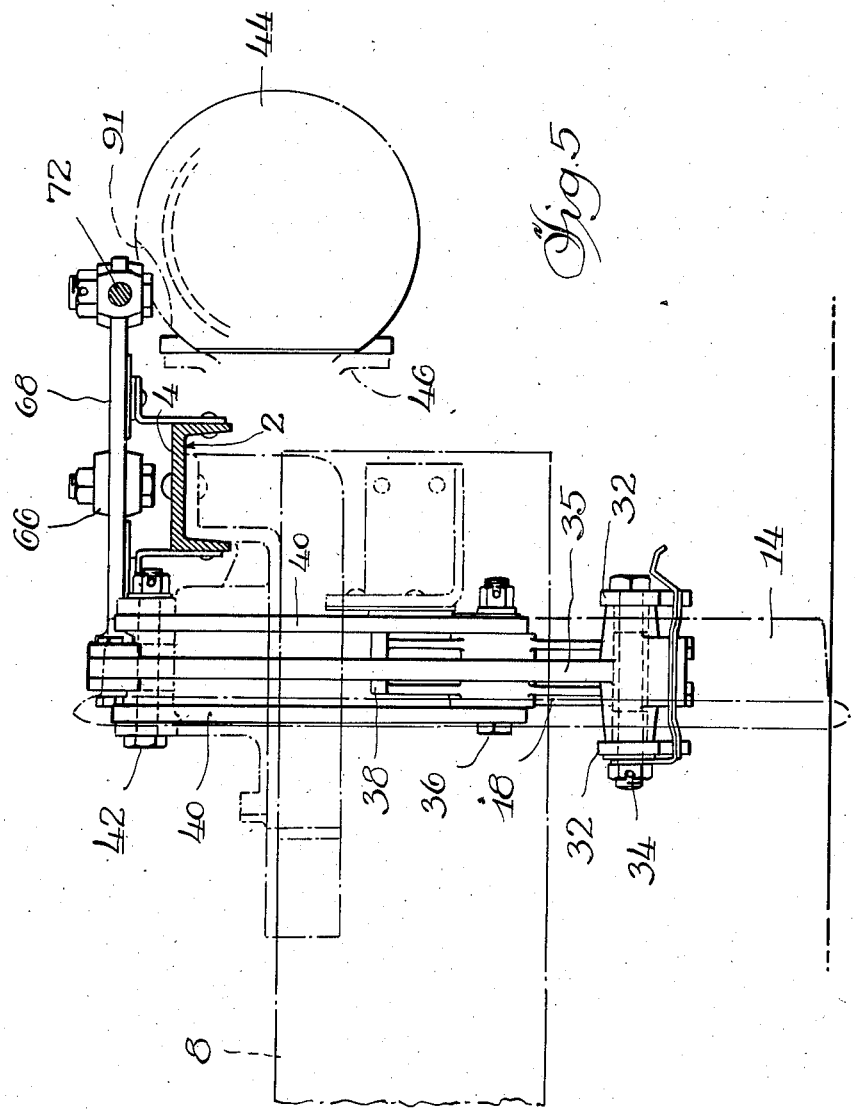

Patented Oct. 2, 1945

2,385,909

UNITED STATES PATENT OFFICE 2,385,909

CLASP BRAKE

Ray G. Aurien, Chicago, Ill., assignor to American Steel Foundries, Chicago, Ill., a corporation of New Jersey Application February 25, 1944, Serial No. 523,787

6 Claims. (Cl. 188—56)

My invention relates to brakes and more particularly to a novel clasp brake rigging for a railway car truck.

The general object of my invention is to design a clasp brake rigging in which an automatic slack adjuster and a power cylinder device are mounted on the outboard side of the truck frame adjacent opposite ends thereof in order to afford clearance for the associated car body which is supported above the truck in conventional manner. The brake rigging comprises a system of interconnected pull rods and levers, one end of said system being connected to the slack adjuster device and the opposite end being connected to the power cylinder device.

A specific object of my invention is to design a novel clasp brake rigging of the type in which interconnected live and dead truck levers are associated with each wheel and axle assembly at opposite sides thereof. Operating means is connected to the live truck levers, said operating means being of novel form and comprising a pair of interconnected live auxiliary levers each being connected to the adjacent live truck lever and each being connected to an adjacent dead auxiliary lever, the dead auxiliary lever at one end of the truck being connected to the slack adjuster device and the dead auxiliary lever at the opposite end of the truck being operatively connected to the power cylinder device.

A different object of my invention is to provide a novel release means for a clasp brake rigging of the above-described type, said release means being in the form of a resiliently mounted plunger bearing against a pad formed on the edge of one of the dead auxiliary levers.

In the drawings,

Figure 1 is a fragmentary top plan view of a railway car truck embodying my invention, only one side of the truck being illustrated inasmuch as it is symmetrical about its longitudinal center line.

Figure 2 is a side elevation of the structure shown in Figure 1.

Figures 3 and 4 are end views taken respectively from the left and the right ends of the truck as illustrated in Figures 1 and 2.

Figure 5 is a sectional view taken in the transverse vertical plane indicated by the line 5—5 of Figure 1.

In each of said figures certain details may be omitted where more clearly illustrated in other views.

Describing my invention in detail, the truck frame generally designated 2 comprises at each side thereof a side rail 4 connected to the spaced end rails 6, 6 and the spaced intermediate transoms 8, 8. The frame 2 comprises the hanger brackets 10, 10 adjacent the connection of each side rail 4 to the transoms 8, 8, said brackets being formed and arranged for the support of an associated truck bolster (not shown) upon which a car body (not shown) may be supported in conventional manner. The truck frame 2 is a built-up or fabricated member of more or less conventional form and will not be described in detail herein except as necessary to clarify the description of the brake rigging to which this application is directed.

At each end thereof the truck frame 2 comprises the spaced pedestal jaws 12, 12 depending from the side rail 4 for cooperation in the usual manner with a pedestal box (not shown) of the adjacent wheel and axle assembly indicated at 14. At opposite sides of each assembly 14 are suspended a pair of brake heads 16 and 18, the head 16 being disposed outwardly of the wheel and axle assemblies 14, 14 and the head 18 being disposed inwardly thereof.

The head 16 carries a shoe 20 for braking cooperation with the adjacent wheel, and said head is pivotally connected at 22 to the inboard and outboard dead hanger levers 24, 24 which are pivotally fulcrumed at 26 at their upper extremities from the truck frame 2 adjacent the juncture of the side rail 4 with the end rail 6, the lower ends of said hanger levers 24, 24 being pivotally connected at 28 to the manual slack adjuster device 30 associated in conventional manner with the spaced inboard and outboard straps 32, 32, the opposite ends of which are pivotally and adjustably connected at 34 to the lower extremity of the live truck lever 35 which is pivotally connected at 36 to the head 18 carrying the brake shoe 38 for braking cooperation with the periphery of the adjacent wheel. Also connected at 36 are the inboard and outboard hangers 40, 40, the upper extremities of which are pivotally connected at 42 to the truck frame.

Operating means is provided for the live and dead truck levers 24, 24 and 35, 35 in the form of a power cylinder device 44 on the outboard side of the frame 2. The piston rod 48 of the device 44 is pivotally connected at 50 to the substantially vertical dead cylinder lever 52 intermediate the ends thereof, the lower extremity of said lever being pivotally fulcrumed at 54 to the cylinder lever bracket 56 on the truck frame. The upper end of the cylinder lever 52 is pivotally connected by means of a link and clevis 58 to the outboard end of the substantially horizontal dead auxiliary lever 60, the inboard end of which is pivotally fulcrumed at 62 to the bracket 64 on the truck frame 2. Intermediate its ends the dead auxiliary lever 60 is pivotally connected by means of a link 66 to the substantially horizontal live auxiliary lever 68, the inboard end of which is pivotally connected by a link and clevis 70 to the adjacent live truck lever 35 at the upper extremity thereof.

The outboard end of the live auxiliary lever 68 is connected by a pull rod 72 to the outboard end of the live auxiliary substantially horizontal lever 74, the inboard end of which is pivotally connected by a link and clevis 76 to the adjacent live truck lever 35 at the upper extremity thereof. Intermediate its ends the live auxiliary lever 74 is afforded a fulcrum by means of a pull rod 78, the opposite end of which is connected to the dead auxiliary lever or slack adjuster lever 80 intermediate the ends thereof.

The lever 80 is afforded a fixed pivotal fulcrum at the inboard end thereof as at 82 to the slack adjuster lever bracket 84 on the truck frame 2, and the outboard end of the lever 80 is pivotally connected at 86 (Figure 1) to the automatic slack adjuster device 88 supported from the slack adjuster bracket 90 on the truck frame. The device 88 is of conventional form and will not be described in detail herein.

It may be noted that the power cylinder device 44 is relieved at 91 (Figure 5) to afford clearance for the outboard extremity of the live auxiliary lever 68.

A release plunger 92 bears at 94 against a pad formed on the edge of the dead auxiliary lever 60 intermediate its ends, said plunger carrying a spring abutment collar or washer 96 bearing against the compression spring 98 sleeved over the plunger 92 and seated at its opposite end against the plunger bracket 100 through which the plunger 92 extends for guiding cooperation therewith, the opposite end of the plunger 92 extending through an aligned opening 102 in the bracket 64 which thus affords guiding means therefor.

In operation of my novel brake rigging the piston rod 48 moves to the right as seen in Figure 2, thus causing the cylinder lever 52 to rotate in a clockwise direction about its pivot 54. This causes the dead auxiliary lever 60 to rotate in a counterclockwise direction about its pivot 62, as best seen in Figure 1, thereby causing the live auxiliary lever 68 to move to the right as seen in Figure 1 and to rotate in a counterclockwise direction about its inboard fulcrum at 70, thus actuating the adjacent live truck lever 35 and the associated rigging at the right end of the truck, as seen in Figures 1 and 2. At the same time, the pull rod 72 moves to the right causing the live auxiliary lever 74 to rotate in a counterclockwise direction about the fulcrum point therefor afforded by the pull rod 78, thus actuating the adjacent live truck lever 35 and the associated rigging at the left end of the truck. Upon release of the power cylinder device 44, the plunger 92 is operable by means of the compression spring 98 to return the dead auxiliary lever 60 to its normal released position, thereby returning the live auxiliary levers 68 and 74 to their normal released positions by means of their connection with the dead auxiliary lever 60, as will be clearly understood by those skilled in the art.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck comprising a truck frame and spaced supporting wheel and axle assemblies, the combination of brake rigging comprising interconnected live and dead truck levers at opposite sides of each assembly, a diagonally arranged dead auxiliary lever having a fixed fulcrum at its inboard end to a bracket on said frame adjacent one end of the truck, an automatic slack adjuster connected to the outboard end of said dead auxiliary lever, a substantially vertical cylinder lever fulcrumed at its lower extremity from said frame adjacent the opposite end of the truck, a power cylinder device operatively connected to said cylinder lever intermediate the ends thereof, a substantially horizontal dead auxiliary lever fulcrumed at its inboard end from said frame adjacent said last-mentioned end of the truck, said last-mentioned dead auxiliary lever being connected at its outboard end to the upper end of said cylinder lever, a pair of spaced substantially horizontal live auxiliary levers, a pull rod connecting the outboard ends of said live auxiliary levers, a connection between the inboard end of each live auxiliary lever and the adjacent live truck lever, means connecting each live auxiliary lever to the adjacent dead auxiliary lever, and release means for said brake rigging comprising resilient means cooperating with the second-mentioned dead auxiliary lever for returning the same to its normal released position after actuation of said brake rigging.

2. In a brake arrangement for a railway car truck comprising a truck frame and spaced supporting wheel and axle assemblies, the combination of interconnected live and dead truck levers at opposite sides of each assembly, a dead auxiliary lever fixedly fulcrumed at its inboard end from a bracket on said frame adjacent one end of the truck, an automatic slack adjuster connected to the outboard end of said dead auxiliary lever, a cylinder lever fulcrumed at its lower end from said frame adjacent the opposite end of the truck, a power cylinder device operatively connected to said cylinder lever intermediate the ends thereof, a dead auxiliary lever fulcrumed at its inboard end from said frame adjacent said last-mentioned end of the truck, said last-mentioned dead auxiliary lever being connected at its outboard end to the upper end of said cylinder lever, a pair of spaced live auxiliary levers, a pull rod connecting the outboard ends of said live auxiliary levers, a connection between the inboard end of each live auxiliary lever and the adjacent live truck lever, a connection between each live auxiliary lever intermediate the ends thereof to the adjacent dead auxiliary lever intermediate the ends thereof, and release means comprising a resiliently mounted plunger bearing against the second-mentioned dead auxiliary lever and operable to return the same to its normal released position.

3. In a brake arrangement for a railway car truck comprising a truck frame and spaced supporting wheel and axle assemblies, the combination of interconnected live and dead truck levers at opposite sides of each assembly, a dead auxiliary lever fixedly fulcrumed at its inboard end from said frame adjacent one end of the truck, an automatic slack adjuster connected to the outboard end of said dead auxiliary lever, a cylinder lever fulcrumed at its lower end from said frame adjacent the opposite end of the truck, a power cylinder device operatively connected to said cylinder lever intermediate the ends thereof, a dead auxiliary lever fulcrumed at its inboard end from said frame adjacent said last-mentioned end of the truck, said last-mentioned dead auxiliary lever being connected at its outboard end to the upper end of said cylinder lever, a pair of spaced live auxiliary levers, a pull rod connecting the outboard ends of said live auxiliary levers, a connection between the inboard end of each live auxiliary lever and the adjacent live truck lever, and a connection between each live auxiliary lever intermediate the ends thereof to the adjacent dead auxiliary lever intermediate the ends thereof.

4. In a brake arrangement for a railway car truck comprising a truck frame and spaced supporting wheel and axle assemblies, the combination of brake rigging comprising interconnected live and dead truck levers at opposite sides of each assembly, a diagonally arranged dead auxiliary lever fixedly fulcrumed at its inboard end from said frame adjacent one end of the truck, an automatic slack adjuster connected to the outboard end of said dead auxiliary lever, a substantially vertical cylinder lever fulcrumed at its lower extremity from said frame adjacent the opposite end of the truck, a power cylinder device operatively connected to said cylinder lever intermediate the ends thereof, a substantially horizontal dead auxiliary lever fulcrumed at its inboard end from said frame adjacent said last-mentioned end of the truck, said last-mentioned dead auxiliary lever being connected at its outboard end to the upper end of said cylinder lever, a pair of substantially horizontal live auxiliary levers, a pull rod connecting the outboard ends of said live auxiliary levers, a connection between the inboard end of each live auxiliary lever and the adjacent live truck lever, and means connecting each live auxiliary lever to the adjacent dead auxiliary lever.

5. In a brake arrangement for a railway car truck comprising a truck frame and spaced supporting wheel and axle assemblies, the combination of a slack adjuster device and a power cylinder device supported from said frame adjacent opposite ends of the truck, a dead auxiliary lever pivotally fulcrumed at its inboard end from a bracket fixed to said frame and pivotally connected at its outboard end to said slack adjuster device, another dead auxiliary lever pivotally connected at its inboard end from said frame, means operatively connecting said power cylinder device to the outboard end of said second-mentioned dead auxiliary lever, a pair of interconnected live auxiliary levers, means connecting each live auxiliary lever intermediate its ends to the adjacent dead auxiliary lever intermediate the ends thereof, braking means for said assemblies operatively connected to the inboard ends of said live auxiliary levers, and resilient release means associated with said second-mentioned dead auxiliary lever for returning the same to normal released position.

6. In a brake arrangement for a railway car truck comprising a truck frame and spaced supporting wheel and axle assemblies, the combination of interconnected live and dead truck levers at opposite sides of each assembly, a pair of interconnected live auxiliary levers, each having an operative connection at its inboard end to the associated live truck lever, a pair of dead auxiliary levers each having a fixed pivotal fulcrum at its inboard end to said frame, means connecting each dead auxiliary lever intermediate its ends to the adjacent live auxiliary lever intermediate its ends, actuating means operatively connected to the outboard end of one dead auxiliary lever, and automatic slack adjuster means operatively connected to the outboard end of the other dead auxiliary lever.

RAY G. AURIEN.